United States Patent
Sahara et al.

(10) Patent No.: US 11,635,512 B2
(45) Date of Patent: Apr. 25, 2023

(54) ELECTRONIC DEVICE, CONTROL METHOD OF ELECTRONIC DEVICE, AND CONTROL PROGRAM OF ELECTRONIC DEVICE

(71) Applicant: KYOCERA Corporation, Kyoto (JP)

(72) Inventors: Tooru Sahara, Yokohama (JP); Masamitsu Nishikido, Yokohama (JP); Yutaka Ootsuki, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 49 days.

(21) Appl. No.: 17/044,426

(22) PCT Filed: Jan. 25, 2019

(86) PCT No.: PCT/JP2019/002532
§ 371 (c)(1),
(2) Date: Oct. 1, 2020

(87) PCT Pub. No.: WO2019/202801
PCT Pub. Date: Oct. 24, 2019

(65) Prior Publication Data
US 2021/0033727 A1  Feb. 4, 2021

(30) Foreign Application Priority Data

Apr. 19, 2018 (JP) .............................. JP2018-080865

(51) Int. Cl.
*G01S 13/931*  (2020.01)
*G01S 13/89*  (2006.01)
(Continued)

(52) U.S. Cl.
CPC ........ *G01S 13/931* (2013.01); *G01S 13/0209* (2013.01); *G01S 13/895* (2019.05); *G06V 20/58* (2022.01)

(58) Field of Classification Search
CPC .. G01S 13/931; G01S 13/895; G01S 13/0209; G01S 7/0232; G01S 7/282;
(Continued)

(56) References Cited

U.S. PATENT DOCUMENTS 6,788,246 B2    9/2004 Uehara
7,474,254 B2 *  1/2009 White ................... G01S 13/867
                                                 343/781 R
(Continued)

FOREIGN PATENT DOCUMENTS

EP   2 244 104 A2   10/2010
JP   H02-10908 B2    3/1990
(Continued)

*Primary Examiner* — Bernarr E Gregory
*Assistant Examiner* — Yonghong Li
(74) *Attorney, Agent, or Firm* — Studebaker & Brackett PC

(57) ABSTRACT

An electronic device includes a controller that performs control to enable switching between a first band mode such that a transmission wave is in a first band and a second band mode such that the transmission wave is in a second band broader than the first band. The controller performs control to switch to the second band mode when an object is detected within a predetermined distance in the first band mode.

8 Claims, 7 Drawing Sheets

(51) Int. Cl.
*G01S 13/02* (2006.01)
*G06V 20/58* (2022.01)

(58) Field of Classification Search
CPC .......... G01S 7/35; G01S 7/354; G01S 7/2922;
G01S 2013/93271; G01S 2013/93272;
G01S 2013/93274; G06V 20/58; G06K
9/00805
See application file for complete search history.

(56) References Cited

U.S. PATENT DOCUMENTS

| | | | |
|---|---|---|---|
| 7,605,745 B2 | 10/2009 | Honda et al. | |
| 7,821,443 B2* | 10/2010 | Winkler | G01S 13/87 |
| | | | 342/146 |
| 8,169,359 B2 | 5/2012 | Aoyagi | |
| 9,261,590 B1* | 2/2016 | Brown | G01S 13/931 |
| 10,502,826 B2* | 12/2019 | Tasovac | G01S 13/878 |
| 10,551,488 B2* | 2/2020 | Cornic | G01S 13/343 |
| 2004/0066322 A1 | 4/2004 | Uehara | |
| 2008/0106458 A1 | 5/2008 | Honda et al. | |
| 2009/0284407 A1 | 11/2009 | Aoyagi | |

FOREIGN PATENT DOCUMENTS

| | | |
|---|---|---|
| JP | H02-212792 A | 8/1990 |
| JP | H11-53030 A | 2/1999 |
| JP | H11-083991 A | 3/1999 |
| JP | H11-133144 A | 5/1999 |
| JP | 2004-125591 A | 4/2004 |
| JP | 2007-263915 A | 10/2007 |
| JP | 2008-298736 A | 12/2008 |
| JP | 2009-059200 A | 3/2009 |
| JP | 2009-276213 A | 11/2009 |
| JP | 2012-163400 A | 8/2012 |
| JP | 2013-238532 A | 11/2013 |
| WO | 2007/014333 A2 | 2/2007 |

* cited by examiner

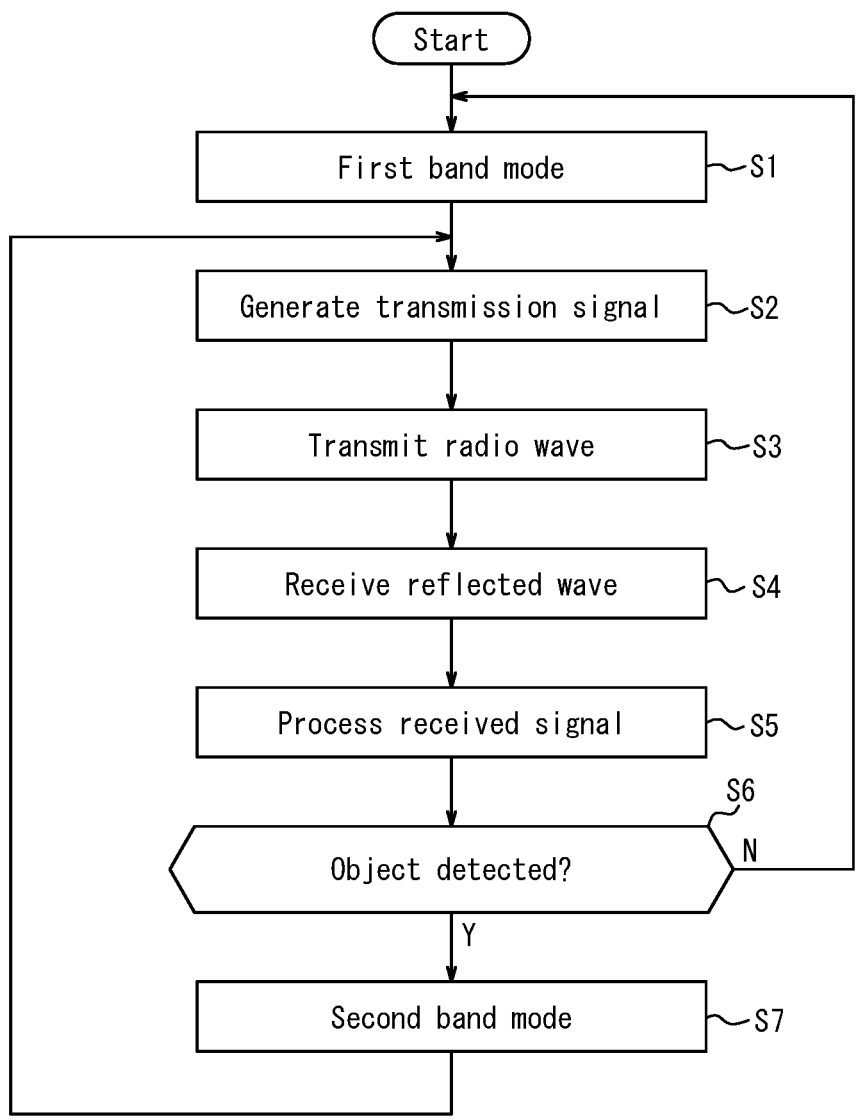

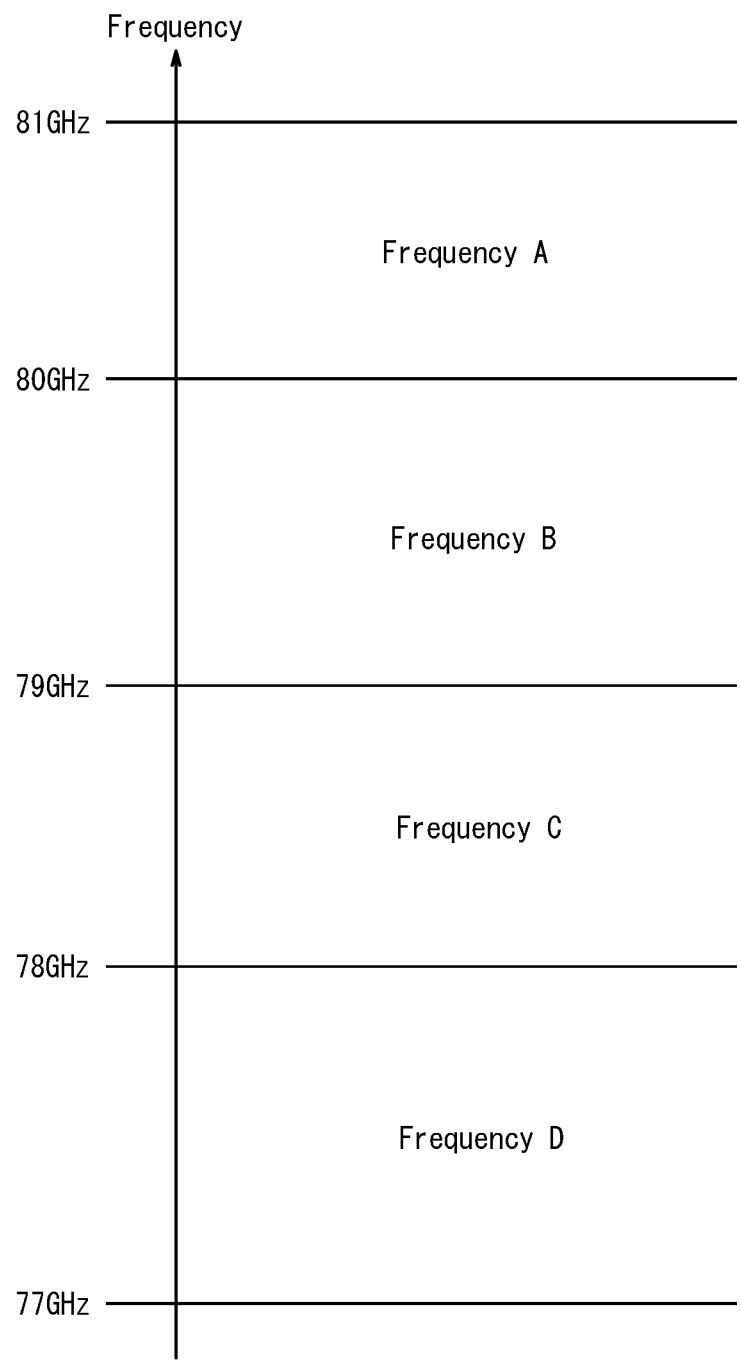

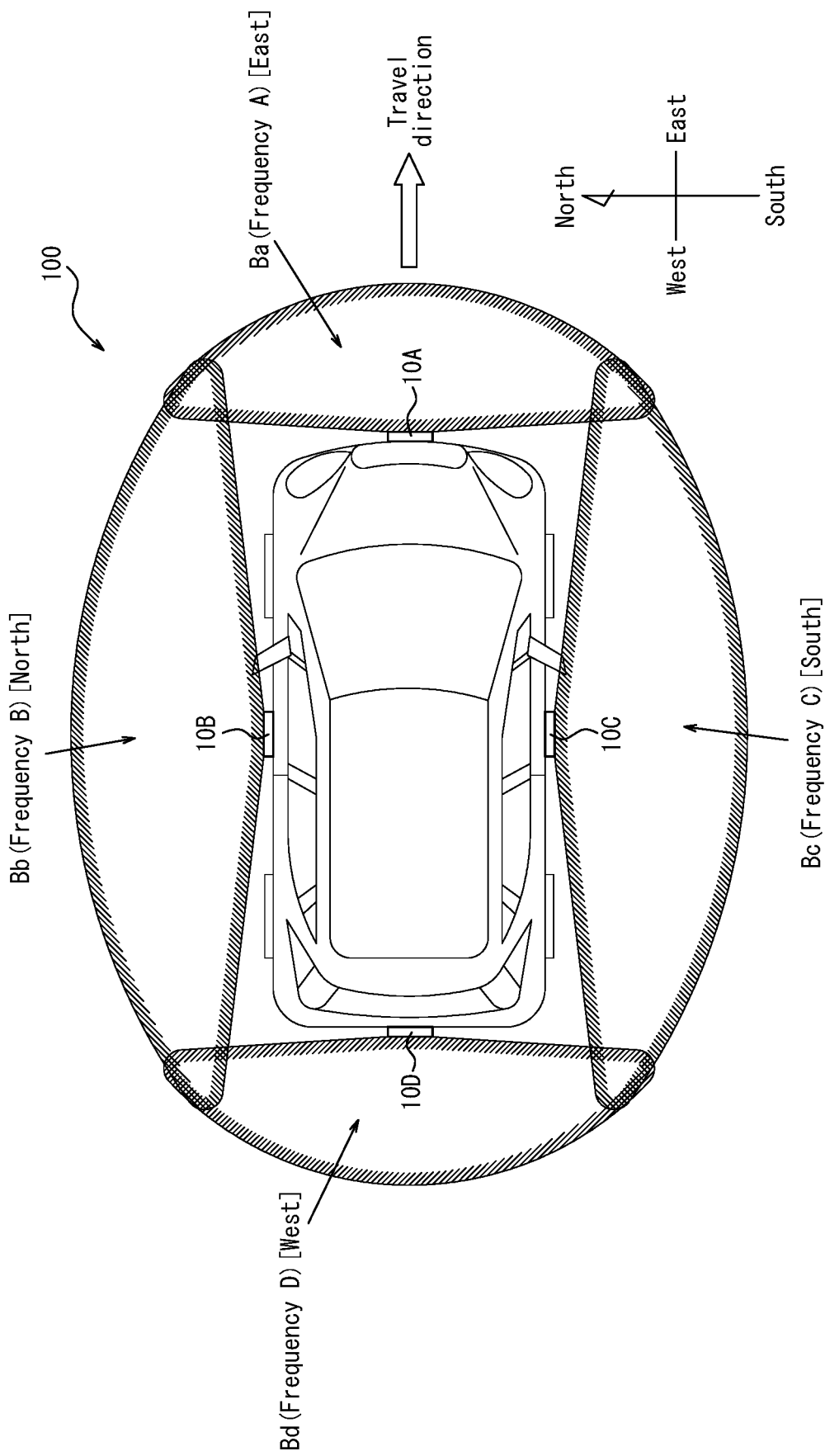

ELECTRONIC DEVICE, CONTROL METHOD OF ELECTRONIC DEVICE, AND CONTROL PROGRAM OF ELECTRONIC DEVICE

CROSS-REFERENCE TO RELATED APPLICATION

The present application claims priority to and the benefit of Japanese Patent Application No. 2018-80865 filed Apr. 19, 2018, the entire contents of which are incorporated herein by reference.

TECHNICAL FIELD

The present disclosure relates to an electronic device, a control method of an electronic device, and a control program of an electronic device.

BACKGROUND

Within industries related to automobile parts, such as the automotive industry, techniques for measuring the distance between a vehicle and an object are important. Techniques for assisting a driver with driving and techniques related to automatic driving to automate part or all of driving have been developed in recent years. The importance of techniques for measuring distance is consequently expected to continue increasing as well. As a technique for measuring distance, patent literature (PTL) 1, for example, discloses a driving support system for measuring the distance between the vehicle containing the driving support system and the vehicle surroundings using millimeter wave radar. PTL 2, for example, discloses a method for setting the inclination during the installation of an antenna.

CITATION LIST

Patent Literature

PTL 1: JP 2009-59200 A
PTL 2: JP H11-133144 A

SUMMARY

An electronic device according to an embodiment includes a transmitter, configured to transmit a transmission wave, and a controller.

The controller is configured to perform control to enable switching between a first band mode such that the transmission wave is in a first band and a second band mode such that the transmission wave is in a second band broader than the first band.

The controller is configured to perform control to switch to the second band mode when an object is detected within a predetermined distance in the first band mode.

A control method of an electronic device according to an embodiment includes transmitting a transmission wave and performing control.

The control is performed to enable switching between a first band mode such that the transmission wave is in a first band and a second band mode such that the transmission wave is in a second band broader than the first band.

The control is performed to switch to the second band mode when an object is detected within a predetermined distance in the first band mode.

A control program of an electronic device according to an embodiment includes causing a computer to transmit a transmission wave and perform control.

The control is performed to enable switching between a first band mode such that the transmission wave is in a first band and a second band mode such that the transmission wave is in a second band broader than the first band.

The control is performed to switch to the second band mode when an object is detected within a predetermined distance in the first band mode.

BRIEF DESCRIPTION OF THE DRAWINGS

In the accompanying drawings:
FIG. 5 is a flowchart illustrating operations of an electronic device according to an embodiment;
FIG. 6 illustrates transmission waves transmitted by the sensor according to an embodiment;
and
FIG. 7 illustrates sensors and transmission waves according to an embodiment.

DETAILED DESCRIPTION

In the above-described distance measurement techniques, convenience could be improved by increasing the efficiency of measurement without reducing the desired measurement accuracy. The present disclosure relates to providing an electronic device, a control method of an electronic device, and a control program of an electronic device with improved convenience during distance measurement. Embodiments can provide an electronic device, a control method of an electronic device, and a control program of an electronic device with improved convenience during distance measurement. Embodiments are described below in detail with reference to the drawings.

An electronic device according to an embodiment uses a sensor installed in a vehicle, such as an automobile, to measure the distance between the sensor and objects located around the sensor. The sensor transmits a transmission wave, such as a radio wave, as a detection wave. The sensor receives a reflected wave that is a portion of the transmission wave reflected by the object. An electronic device according to an embodiment measures the distance between the sensor and the object based on the transmission wave transmitted by the sensor and the received wave received by the sensor.

A configuration in which an electronic device according to an embodiment is mounted in an automobile, such as a passenger car, is described below as a typical example. An electronic device according to an embodiment is not, however, limited to being mounted in automobiles or the like. An electronic device according to an embodiment may be mounted on various moveable bodies, such as a bus, tractor, motorcycle, bicycle, ship, aircraft, or pedestrian. An electronic device according to an embodiment is not necessarily limited to being mounted in a moveable body that moves on its own. An electronic device according to an embodiment can measure the distance between the sensor and an object during conditions such that at least one of the sensor and the object can move. An electronic device according to an embodiment may clearly also measure the distance between the sensor and an object when both the sensor and the object are stationary.

Figure 1:
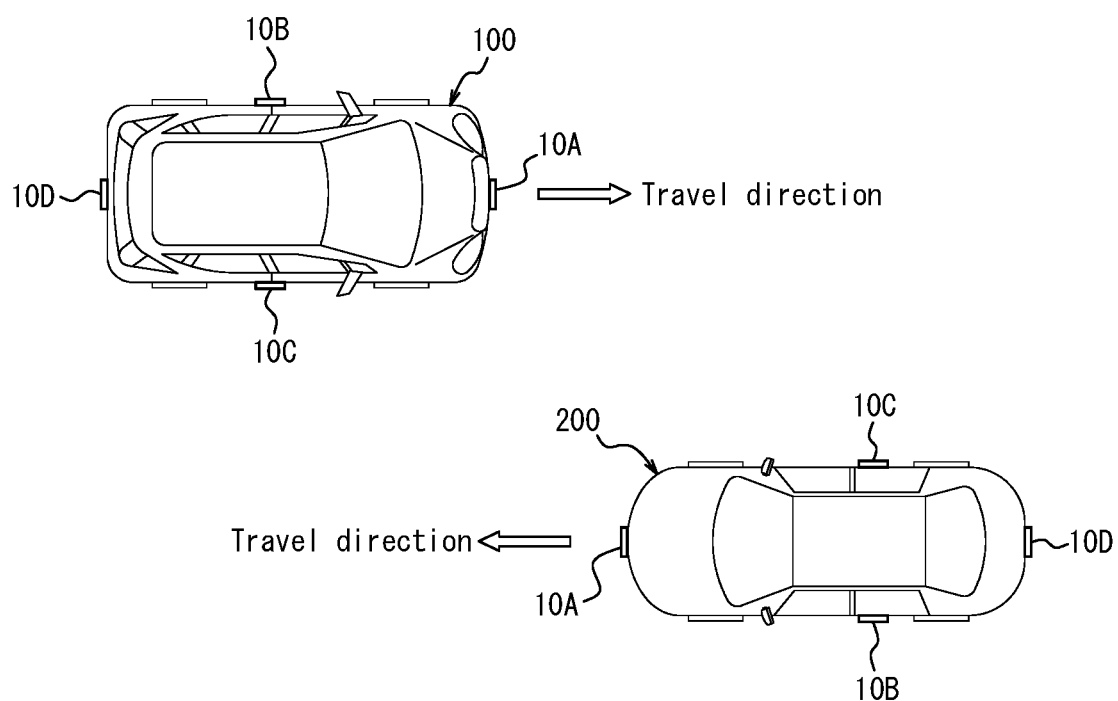
FIG. 1 illustrates a mode of use of an electronic device according to an embodiment.

FIG. 1 illustrates a mode of use of an electronic device according to an embodiment. FIG. 1 illustrates an example in which sensors according to an embodiment are installed in an automobile.

Sensors according to an embodiment are installed in both the vehicle 100 and the vehicle 200 illustrated in FIG. 1. The vehicle 100 and the vehicle 200 illustrated in FIG. 1 may be automobiles such as passenger cars or may each be any other type of vehicle. In FIG. 1, the vehicle 100 and the vehicle 200 may be moving in the travel directions indicated by the arrows or may be stationary, without moving.

As illustrated in FIG. 1, the vehicle 100 and the vehicle 200 each include a sensor 10A, a sensor 10B, a sensor 10C, and a sensor 10D. The sensor 10A is installed at the front of the vehicle 100 and the vehicle 200. The sensor 10B is installed at the left side of the vehicle 100 and the vehicle 200. The sensor 10C is installed at the right side of the vehicle 100 and the vehicle 200. The sensor 10D is installed at the rear of the vehicle 100 and the vehicle 200. The sensor 10A, the sensor 10B, the sensor 10C, and the sensor 10D are referred to simply as the "sensor 10" in the explanation below when no distinction therebetween is made. The positions at which the sensors 10 are provided in the vehicle are not limited to the positions illustrated in FIG. 1 and may be other positions as appropriate.

Inclusion of the sensor 10A, the sensor 10B, the sensor 10C, and the sensor 10D enable both the vehicle 100 and the vehicle 200 to detect objects located within a predetermined distance in a 360 degree range around the vehicle. For example, the vehicle 100 can detect the vehicle 200 as an object using one of the sensors 10, as illustrated in FIG. 1. Specifically, the sensor 10 installed in the vehicle 100 detects the presence of the vehicle 200, which is an object around the vehicle 100. The distance between the vehicle 100 in which the sensor 10 is installed and the vehicle 200, which is the object, is measured by the sensor 10. The vehicle 100 can also detect pedestrians, obstacles, and the like present around the vehicle 100 as objects using any of the sensors 10.

Similarly, the vehicle 200 can detect the vehicle 100 as an object using one of the sensors 10, as illustrated in FIG. 1. The vehicle 200 can also detect pedestrians, obstacles, and the like present around the vehicle 100 as objects using any of the sensors 10.

Figure 2:
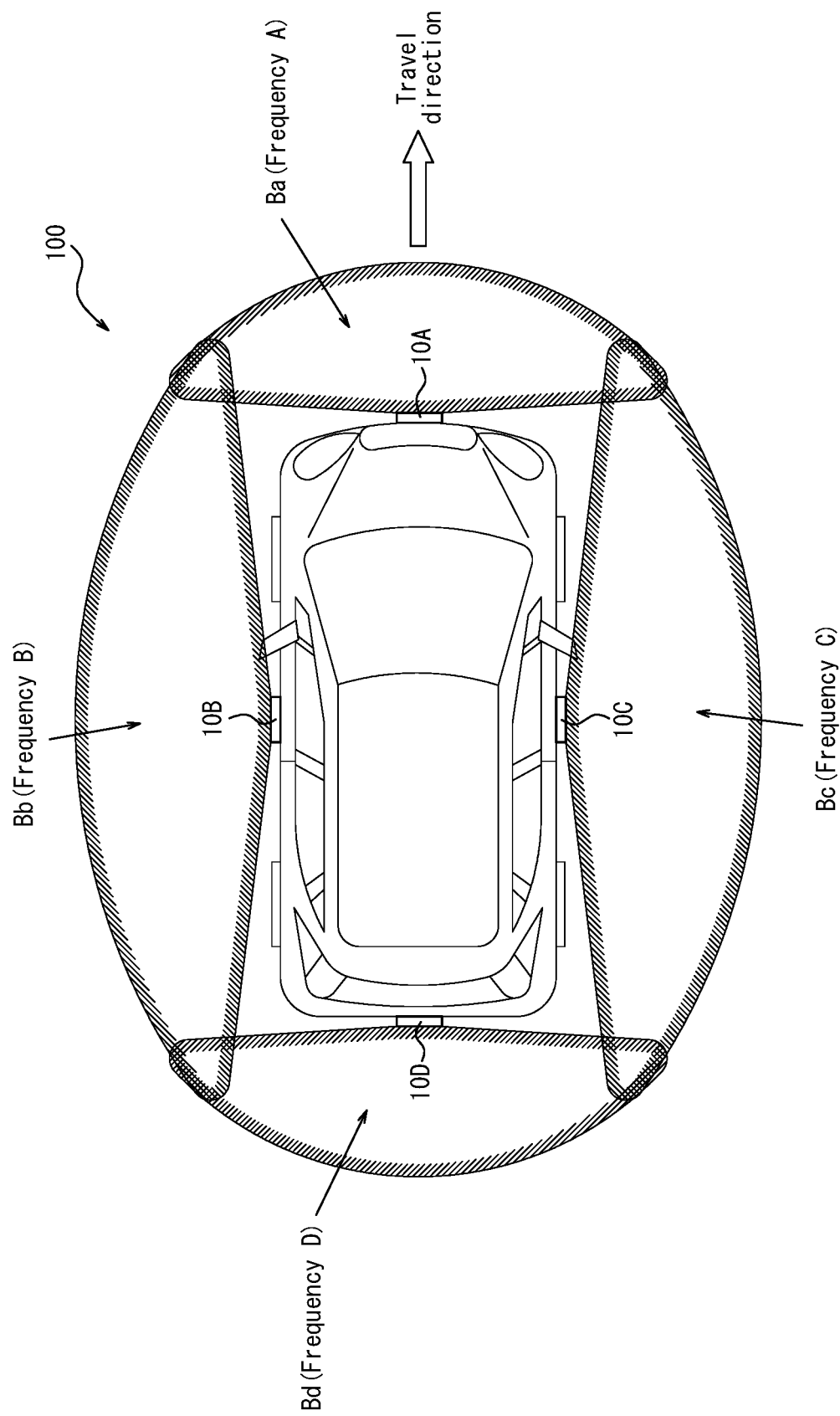
FIG. 2 illustrates sensors and transmission waves according to an embodiment.

FIG. 2 illustrates the sensors according to an embodiment and the transmission waves transmitted by the sensors.

FIG. 2 schematically illustrates the sensor 10A, the sensor 10B, the sensor 10C, and the sensor 10D installed in the vehicle 100 each in a state of forming a transmission wave beam. The sensor 10 is typically a radio detecting and ranging (radar) sensor that transmits and receives radio waves. The sensor 10 is not, however, limited to being a radar sensor. The sensor 10 according to an embodiment may, for example, be a sensor based on a light detection and ranging or laser imaging detection and ranging (lidar) technique that uses optical waves. The sensor 10 according to an embodiment may, for example, be based on a sound navigation and ranging (sonar) technique that uses sound waves. The sensor 10 may, for example, be configured to include a patch antenna or the like. The configuration of the sensor 10 is further described below.

As illustrated in FIG. 2, the sensor 10A installed in the front of the vehicle 100 forms a beam Ba of transmission waves at the front of the vehicle 100. The frequency of the transmission waves of the beam Ba is, for example, A. The sensor 10B installed on the left side of the vehicle 100 forms a beam Bb of transmission waves at the left side of the vehicle 100. The frequency of the transmission waves of the beam Bb is, for example, B. The sensor 10C installed on the right side of the vehicle 100 forms a beam Bc of transmission waves at the right side of the vehicle 100. The frequency of the transmission waves of the beam Bc is, for example, C. The sensor 10D installed at the rear of the vehicle 100 forms a beam Bd of transmission waves at the rear of the vehicle 100. The frequency of the transmission waves of the beam Bd is, for example, D.

As illustrated in FIG. 2, each sensor 10 may transmit transmission waves so as to form a beam with a radiation angle close to 180 degrees. When four such sensors 10 are used, the entire perimeter of the vehicle 100 is surrounded by beams of transmission waves from the sensors 10, as illustrated in FIG. 2. The locations where the sensors 10 are installed and the radiation angles of the sensors 10 are not, however, limited to the example in FIG. 2. For example, sensors 10 with a radiation angle narrower than 180 degrees may be installed in the vehicle 100. In this case, more than four sensors 10 may be installed in the vehicle 100 so that the entire perimeter of the vehicle 100 is surrounded by beams of transmission waves from the sensors 10. When the entire perimeter of the vehicle 100 need not be surrounded by beams of transmission waves from the sensors 10, the radiation angle of the beam from the sensor 10 may be made narrower, or the number of sensors 10 installed may be reduced.

Figure 3:
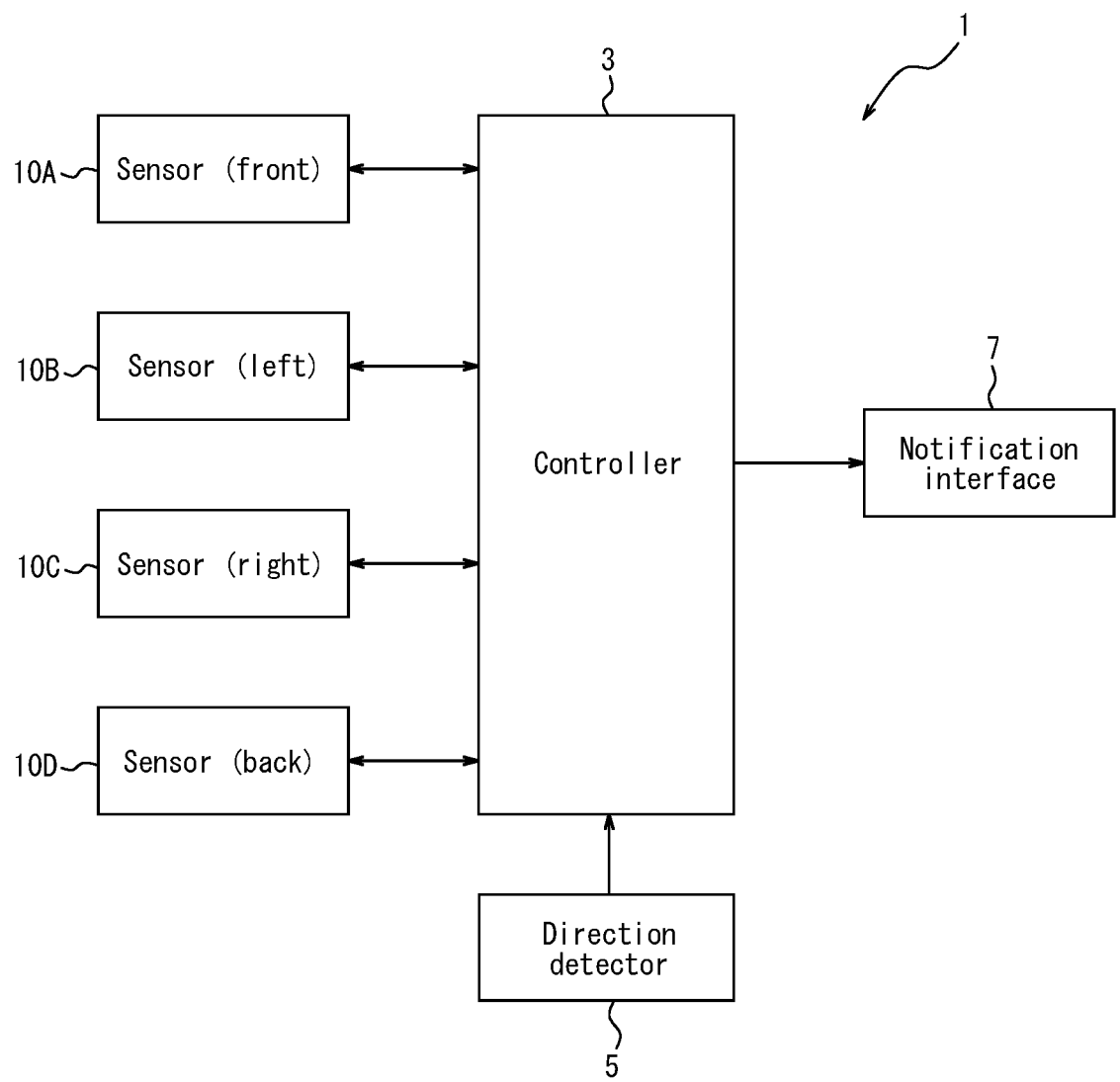
FIG. 3 is a functional block diagram illustrating the schematic configuration of an electronic device according to an embodiment.

FIG. 3 is a functional block diagram illustrating the schematic configuration of an electronic device according to an embodiment. The configuration of the electronic device according to an embodiment is described below.

An electronic device 1 according to an embodiment includes at least a controller 3, as illustrated in FIG. 3. The above-described sensor 10A, sensor 10B, sensor 10C, and sensor 10D are respectively connected to the controller 3. A direction detector 5 and a notification interface 7 are also connected to the controller 3.

To provide control and processing capability for executing various functions, the controller 3 may include at least one processor, such as a central processing unit (CPU). The controller 3 may be implemented collectively by one processor, implemented by several processors, or implemented by individual processors. The processor may be implemented as a single integrated circuit (IC). The processor may be implemented as a plurality of integrated circuits and discrete circuits communicably connected to each other. The processor may be implemented based on various other known techniques. In an embodiment, the controller 3 may be configured by a CPU and a program executed by the CPU. As appropriate, the controller 3 may include a storage, such as memory, necessary for operations by the controller 3. The storage may store a program executed by the controller 3, the result of processing executed by the controller 3, and the like. The storage may function as a working memory of the controller 3. Operations by the controller 3 according to an embodiment are further described below.

The direction detector 5 detects the direction of the vehicle in which the electronic device 1 is mounted, for example. The direction detector 5 may be an electronic compass or the like that detects the earth's magnetism. The direction detector 5 may acquire position information of the electronic device based on a global navigation satellite system (GNSS) or the like. A GNSS may include a satellite positioning system, such as global positioning system (GPS), GLONASS, Galileo, or quasi-zenith satellite system (QZSS). For example, the direction detector 5 may have a position information acquisition device such as a GPS module included therein. In this case, the direction detector 5 may acquire the position information of the electronic device 1 and detect the direction of the vehicle in which the electronic device 1 is mounted based on the change over time in the position information. Instead of or in addition to a position information acquisition device such as a GPS module, the direction detector 5 may include a sensor such as a gyroscope. When, for example, a car navigation system is also mounted in the vehicle in which the electronic device 1 is mounted, the direction of the vehicle may be detected from the car navigation system.

In an embodiment, the direction detector 5 may detect whether the vehicle 100 in which the electronic device 1 is mounted is facing north, south, east, or west, for example. The controller 3 can thereby acquire (information on) the direction detected by the direction detector 5.

The notification interface 7 notifies the user of the electronic device 1 or the like of information such as the result of the electronic device 1 measuring the distance. A variety of configurations for the notification interface 7 can be envisioned in accordance with the information of which the user is notified. For example, when notification of information such as the result of the electronic device 1 measuring the distance is provided visually, with characters and/or images or the like, the notification interface 7 may be a display device such as a liquid crystal display (LCD), an organic EL display, or an inorganic EL display. When notification of information such as the result of the electronic device 1 measuring the distance is provided as more simple visual information, the notification interface 7 may be a light-emitting device such as a light-emitting diode (LED). When notification of information such as the result of the electronic device 1 measuring the distance is provided as audible information, such as sound or voice, the notification interface 7 may be any speaker, buzzer, or the like. The notification interface 7 may be configured to include one or more of the above-described functional components.

When a predetermined object is detected within a predetermined distance around the vehicle 100 in an embodiment, for example, the notification interface 7 may provide corresponding notification by characters and/or an image or the like. The notification interface 7 may provide a display to alert the driver of the vehicle 100 when a predetermined object is detected within a predetermined distance. The notification interface 7 may provide notification, by characters and/or an image or the like, of the detected position of a predetermined object around the vehicle 100 when the predetermined object is detected within a predetermined distance. Furthermore, the notification interface 7 may display the distance between a predetermined object and the vehicle 100 as a number, a diagram, or the like when the predetermined object is detected within a predetermined distance.

The notification interface 7 in an embodiment may, for example, simply turn on a warning light when a predetermined object is detected within a predetermined distance around the vehicle 100. Furthermore, the notification interface 7 in an embodiment may, for example, provide a predetermined warning and/or various information as audio information when a predetermined object is detected within a predetermined distance around the vehicle 100.

The electronic device 1 according to an embodiment may include only the controller 3 as a minimal configuration. In addition to the controller 3, the electronic device 1 according to an embodiment may also include at least one of the following, as illustrated in FIG. 3: at least one sensor 10, the direction detector 5, and the notification interface 7. The electronic device 1 according to an embodiment can thus be configured in a variety of ways. When the electronic device 1 according to an embodiment is mounted in the vehicle 100, then the controller 3, the direction detector 5, and the notification interface 7 may be installed at appropriate locations, such as inside the vehicle 100. In an embodiment, at least one of the controller 3, the direction detector 5, and the notification interface 7 may be installed outside the vehicle 100.

Next, the sensor 10 according to an embodiment is described. The sensor 10 according to an embodiment is described below as being a radar sensor that receives and transmits radio waves.

Figure 4:
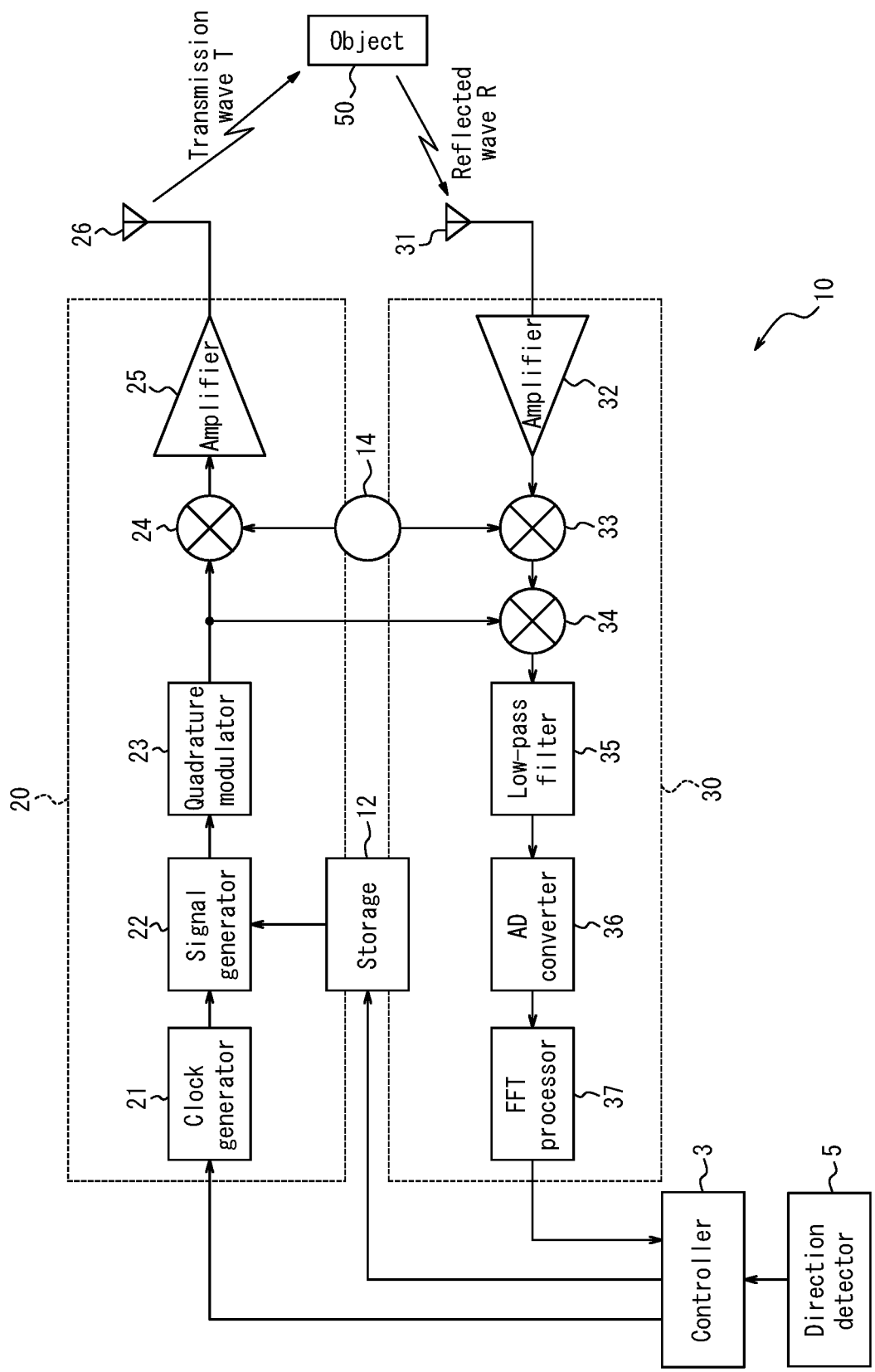
FIG. 4 is a functional block diagram illustrating the schematic configuration of a sensor according to an embodiment.

FIG. 4 is a functional block diagram illustrating the schematic configuration of the sensor 10 according to an embodiment. With reference to FIG. 4, the sensor 10 according to an embodiment is described below. FIG. 4 illustrates one sensor 10 as a representative example from among the sensor 10A, the sensor 10B, the sensor 10C, and the sensor 10D illustrated in FIGS. 1 to 3.

As illustrated in FIG. 4, the sensor 10 according to an embodiment is, broadly speaking, configured to include a transmitter 20 and a receiver 30. FIG. 4 schematically illustrates a state in which a transmission antenna 26 of the transmitter 20 is transmitting a transmission wave T. In FIG. 4, the portion of the transmission wave T reflected by an object 50 is indicated as a reflected wave R. The object 50 may be another vehicle other than the vehicle 100, such as the vehicle 200, or may be any other object other than the vehicle 100, such as a pedestrian or an obstacle. FIG. 4 schematically illustrates a state in which a reception antenna 31 of the receiver 30 receives the reflected wave R. A storage 12 and a synthesizer 14 illustrated in FIG. 4 may be included in the transmitter 20, included in the receiver 30, or be provided separately from the transmitter 20 and the receiver 30.

The synthesizer 14 is an oscillator circuit that uses electronic high frequency synthesis and becomes a radar signal source. The synthesizer 14 may, for example, be configured by a frequency synthesizer IC, a frequency synthesizer circuit, or the like.

The storage 12 may be a semiconductor memory, a magnetic memory, or the like. The storage 12 may be connected to the controller 3. The storage 12 stores various information, programs executed by the controller 3, and the like. The storage 12 may function as a working memory of the controller 3. The storage 12 may be included in the controller 3.

The transmitter 20 and the receiver 30, including the storage 12 and the synthesizer 14, may each have the same configuration as a known radar sensor, and the same functional components as in a known radar sensor may be used. Accordingly, a description of matter similar to a known radar sensor is simplified or omitted below.

As illustrated in FIG. 4, the transmitter 20 can be configured to include a clock generator 21, a signal generator 22, a quadrature modulator 23, a mixer 24, a transmission amplifier 25, and the transmission antenna 26, for example.

In the transmitter 20, the clock generator 21 is controlled by the controller 3 to generate a clock signal CLK. The clock signal generated by the clock generator 21 is supplied to the signal generator 22. In response to control by the controller 3, a transmission signal sequence generated based on the direction information detected by the direction detector 5 is assumed to be stored in the storage 12.

The signal generator 22 generates a transmission signal based on the clock signal generated by the clock generator 21 and a transmission signal sequence read from the storage 12. The signal generated by the signal generator 22 can, for example, be a radar signal in a frequency modulated continuous wave (FM-CW) method. The signal generated by the signal generator 22 is not, however, limited to being a signal in an FM-CW method. The signal generated by the signal generator 22 may be a signal used in various methods, such as a pulse method, a pulse compression method (spread spectrum method), or a frequency continuous wave (CW) method. The transmission signal sequences stored in the storage 12 may differ in accordance with these methods. For example, in the case of the above-described radar signal in the FM-CW method, a signal whose frequency increases and a signal whose frequency decreases every time sample may be used. Known techniques can be used as appropriate for the above-described transmission methods. A more detailed description is therefore omitted.

The signal generator 22 is controlled by the controller 3, for example, to allocate the frequency of the transmission signal when generating the transmission signal. In an embodiment, the band that the signal generator 22 uses when allocating the frequency of the transmission signal is determined as follows.

For example, when using a millimeter wave radar in the 79 GHz band, the use of millimeter waves with a 4 GHz bandwidth, i.e. a 4 GHz band allocated from 77 GHz to 81 GHz, is prescribed. Millimeter waves with an x GHz bandwidth are also referred to below as millimeter waves of the x GHz band, where x is any number. The x GHz bandwidth is also referred to below as the x GHz band, where x is any number. In this case, a 1 GHz band, for example, can be used as a portion of the 4 GHz band allocated to the band from 77 GHz to 81 GHz. Accordingly, an operating mode in which the transmission wave T is a first band W1 in an embodiment is referred to as a "first band mode". An operating mode in which the transmission wave T is a second band W2 broader than the first band W1 in an embodiment is referred to as a "second band mode". As described above, millimeter waves of a 1 GHz band may be transmitted as the transmission wave T in the first band mode, for example. Millimeter waves of a 4 GHz band may be transmitted as the transmission wave T in the second band mode, for example. The first band mode and the second band mode are described in greater detail below. In this way, the transmission signal generated by the signal generator 22 is supplied to the quadrature modulator 23.

The quadrature modulator 23 performs quadrature modulation on the transmission signal supplied by the signal generator 22. The signal subjected to quadrature modulation by the quadrature modulator 23 is supplied to the mixer 24 of the transmitter 20 and the mixer 34 of the receiver 30.

The mixer 24 performs frequency conversion by mixing the signal subjected to quadrature modulation by the quadrature modulator 23 with the signal supplied by the synthesizer 14 to increase the frequency of the transmission signal to the center frequency of the millimeter waves. The transmission signal subjected to frequency conversion by the mixer 24 is supplied to the transmission amplifier 25.

The transmission amplifier 25 boosts the transmission power of the transmission signal subjected to frequency conversion by the mixer 24. The transmission signal whose transmission power was boosted by the transmission amplifier 25 is transmitted from the transmission antenna 26 as the transmission wave T.

When an object 50 is located within the range reached by the transmission wave T transmitted from the transmission antenna 26, a portion of the transmission wave T is reflected by the object 50 and becomes the reflected wave R, as illustrated in FIG. 4.

The receiver 30 can be configured to include the reception antenna 31, a reception amplifier 32, a mixer 33, the mixer 34, a low-pass filter 35, an A/D converter 36, and an FFT processor 37, for example, as illustrated in FIG. 4.

In the receiver 30, the reception antenna 31 receives the reflected wave R. The received signal based on the reflected wave R received by the reception antenna 31 is supplied to the reception amplifier 32. The reception amplifier 32 may be a low noise amplifier that amplifies, with low noise, the received signal supplied by the reception antenna 31. The received signal amplified by the reception amplifier 32 is supplied to the mixer 33.

The mixer 33 performs frequency conversion by mixing the received signal at an RF frequency supplied by the reception amplifier 32 with the signal supplied by the synthesizer 14 to decrease the frequency of the received signal to an IF frequency. The received signal subjected to frequency conversion by the mixer 33 is supplied to the mixer 34.

The mixer 34 generates a beat signal by multiplying the received signal subjected to frequency conversion by the mixer 33 by a signal subjected to quadrature modulation by the quadrature modulator 23. The beat signal generated by the mixer 34 is supplied to the low-pass filter 35.

The low-pass filter 35 removes noise from the beat signal supplied by the mixer 34. The beat signal with the noise removed therefrom by the low-pass filter 35 is supplied to the A/D converter 36.

The A/D converter 36 may be configured by any analog to digital converter (ADC). The A/D converter 36 digitalizes the analog beat signal with the noise removed therefrom by the low-pass filter 35. The beat signal digitalized by the A/D converter 36 is supplied to the FFT processor 37.

The FFT processor 37 may be configured by any circuit, chip, or the like that performs fast Fourier transform (FFT) processing. The FFT processor 37 performs FFT processing on the beat signal digitalized by the A/D converter 36. The result of FFT processing by the FFT processor 37 is supplied to the controller 3.

The FFT processor 37 performs the FFT processing in the above-described first band W1 or second band W2 that is broader than the first band W1. In other words, in the above-described first band mode, the signal generator 22 generates a transmission signal in the first band W1, and the FFT processor 37 performs the FFT processing on the received signal in the first band W1. In the above-described second band mode, the signal generator 22 generates a transmission signal in the second band W2 that is broader than the first band W1, and the FFT processor 37 performs the FFT processing on the received signal in the second band W2.

A frequency spectrum is obtained as the result of the FFT processor 37 performing the FFT processing on the beat signal. From this frequency spectrum, the controller 3 can judge whether a predetermined object 50 is present in the range of the beam emitted by the sensor 10. In other words, the controller 3 can judge whether a predetermined object 50 is present in the range of the beam emitted by the sensor 10 based on the beat signal subjected to FFT processing. When the predetermined object 50 is present, the controller 3 can also measure the distance between the sensor 10 and the object 50 based on the beat signal subjected to FFT processing. Furthermore, when the predetermined object 50 is present, the controller 3 can also judge the positional relationship between the sensor 10 and the object 50 based on the beat signal subjected to FFT processing. In this way, the distance from an object 50 can be measured based on the beat signal obtained from the signal transmitted as the transmission wave T and the signal received as the reflected wave R in an embodiment. An actual ranging technique for measuring distance based on a beat signal acquired using millimeter radar in the 79 GHz band, for example, is well known. A more detailed description is therefore omitted.

Next, the operations of the electronic device 1 according to an embodiment are described.

As described above, the electronic device 1 measures the distance from an object 50 based on the signal transmitted as the transmission wave T and the signal that is the portion of the transmission wave T reflected by the object T and received as the reflected wave R. The electronic device 1 can operate in the above-described first band mode and the above-described second band mode. In the first band mode, the distance is measured using radio waves in the first band W1 that is narrower than the second band W2. Accordingly, measurement in the first band mode has a relatively small amount of power consumption for measurement but has a relatively low distance resolution during measurement. In the second band mode, on the other hand, the distance is measured using radio waves in the second band W2 that is broader than the first band W1. Accordingly, measurement in the second band mode has a relatively high distance resolution during measurement but has a relatively high amount of power consumption for measurement. In an embodiment, the controller 3 therefore performs control to enable switching between the first band mode and the second band mode. The operations of the electronic device 1 according to an embodiment are described in greater detail below. Specifically, a method of switching the transmitted signal when it is judged that a reflective object is present may be adopted as a method of switching the band. The following method, for example, may be adopted as the method of judging that a reflective object is present. When an FFT is performed on a beat signal yielded by multiplying the transmission signal by the received signal, a peak appears at the frequency corresponding to the delay time thereof. A reflective object can be judged to be present when the peak is equal to or greater than a threshold. The threshold may be set in advance based on various simulations, experiments, or the like.

FIG. 5 is a flowchart illustrating operations of the electronic device 1 according to an embodiment.

The process illustrated in FIG. 5 may begin when distance is measured by the electronic device 1, for example.

When the process illustrated in FIG. 5 begins, the controller 3 first performs control to set the operating mode of the electronic device 1 to the first band mode (step S1). In other words, the controller 3 sets the operating mode to an operating mode for signal generation and signal processing in the first band W1 that is a 1 GHz band, for example, in step S1. As described above, operations in the first band mode have a relatively low distance resolution during measurement but have a relatively small amount of power consumption. Accordingly, the electronic device 1 can suppress power consumption at normal times.

After setting the operating mode to the first band mode in step S1, the controller 3 performs control to generate the transmission signal to be transmitted from the sensor 10 (step S2). In step S2, the transmission signal is mainly generated by performing the operations described in FIG. 4 from operations by the clock generator 21 through operations by the transmission amplifier 25 in the transmitter 20. A further description of the matter already described with reference to FIG. 4 is omitted.

After the transmission signal is generated in step S2, the controller 3 performs control to transmit the transmission signal from the transmission antenna 26 as a radio wave (step S3). The radio wave is mainly transmitted in step S3 by performing the operations described in FIG. 4 from operations by the transmission amplifier 25 through operations by the transmission antenna 26.

When the electronic device 1 transmits signals from a plurality of sensors 10, the controller 3 may perform control in steps S2 and S3 so that the plurality of sensors 10 transmit the signals sequentially rather than simultaneously.

After the radio waves are transmitted in step S3, the controller performs control to receive the reflected wave with the reception antenna 31 (step S4). The reflected wave is mainly received in step S4 by performing the operations described in FIG. 4 from operations by the reception antenna 31 through operations by the reception amplifier 32 of the receiver 30. The reception antenna 31 receives the portion of the transmitted wave, transmitted from the transmission antenna 26, that is reflected by the object 50 as a reflected wave, as described above.

After the reflected wave is received in step S4, the controller 3 performs control to process the received signal based on the received reflected wave (step S5). The received signal is mainly processed in step S5 by performing the operations described in FIG. 4 from operations by the reception amplifier 32 through operations by the FFT processor 37. The operations in step S5 enable the controller 3 to recognize whether a predetermined object 50 is present within a predetermined distance from the sensor 10. When a predetermined object 50 is present within a predetermined distance from the sensor 10, the operations in step S5 also enable the controller 3 to recognize the distance from the sensor 10 to the predetermined object 50. The predetermined object 50 may be any of a variety of objects, such as a surrounding vehicle (a vehicle ahead or behind in the same lane, or an oncoming vehicle), a pedestrian, or an obstacle, as described above.

When the received signal is processed in step S5, the controller 3 judges whether an object 50 was detected within a predetermined distance (step S6). The predetermined distance in step S6 may, for example, be determined taking into account the distance that enables the vehicle 100 in which the electronic device 1 is mounted to stop safely, without colliding with the object 50. The predetermined distance may be a fixed or variable value. In general, when the vehicle 100 is an automobile or the like, the braking distance lengthens as driving speed increases. The controller 3 may, for example, therefore perform control to lengthen the predetermined distance as the travel speed of the vehicle 100 in which the electronic device 1 is mounted increases. An example of a specific technique for judging, in step S6, whether an object 50 was detected within a predetermined distance is further described below.

When it is judged that an object 50 was not detected within the predetermined distance in step S6, the controller 3 returns to step S1 and continues operations in the first band mode (distance measurement). Conversely, when it is judged that an object 50 was detected within the predetermined distance in step S6, the controller 3 performs control to set operations of the electronic device 1 to the second band mode (step S7). In other words, the controller 3 sets the operating mode to an operating mode for signal generation and signal processing in the second band W2 that is broader than the first band W1, such as a 4 GHz band, in step S7. As described above, operations in the second band mode have a relatively large power consumption for measurement but have a relatively high distance resolution during measurement. Accordingly, the electronic device 1 can increase the measurement accuracy during distance measurement in this case.

After setting the mode to the second band mode in step S7, the controller 3 performs the operations of steps S2 through S5 to transmit the transmission signal as a transmission wave and process the received signal based on the reflected wave that is received. The electronic device 1 can thereby increase the measurement accuracy during distance measurement. With the increased distance resolution, the electronic device 1 in the second band mode can also simultaneously measure the distance to a plurality of objects.

In an embodiment, the controller 3 thus performs control to enable switching between the first band mode and the second band mode. In an embodiment, the controller 3 performs control to switch to the second band mode when an object 50 is detected within a predetermined distance in the first band mode.

As described above, the electronic device 1 according to an embodiment can reduce power consumption by not normally transmitting wideband radar. The electronic device 1 according to an embodiment makes rough distance measurements with a relatively low distance resolution while a predetermined object 50 is not detected within a predetermined distance. Conversely, the electronic device 1 according to an embodiment makes precise distance measurements with high distance resolution when a predetermined object 50 is detected within a predetermined distance. Therefore, the electronic device 1 according to an embodiment can increase the efficiency of measurement without reducing the desired measurement accuracy, thereby increasing convenience.

With relation to step S6 of FIG. 5, the judgment of whether an object 50 has been detected within a predetermined distance is described next in greater detail.

In general, a constant false alarm rate (CFAR) process is known as a technique for automatically detecting a target during radar signal processing. It is also known that a cell averaging (CA) CFAR process is effective when the received signal includes both a target signal and white noise such as receiver noise.

In the electronic device 1 according to an embodiment, the FFT processor 37 performs FFT processing on the beat signal obtained by the processing of the mixer 34 illustrated in FIG. 4, thereby obtaining a frequency spectrum, as described above. The controller 3 in an embodiment may therefore judge that an object 50 has been detected within a predetermined distance when, in the frequency spectrum obtained in this way, the ratio to the average noise intensity excluding the peak in the frequency spectrum exceeds a threshold. The average power in the frequency spectrum varies by time. Accordingly, the threshold of the ratio between the peak and the average power may be a variable threshold that varies by time. A method such as CFRA-CA (average noise power of the surrounding area excluding the neighborhood of the peak) or CRAF-OS (taking the $N^{th}$ from the lowest as the noise power among the noise powers of the surrounding area excluding the neighborhood of the peak) can be used as the method of calculating the noise intensity. Known techniques can be used as appropriate for these methods. A more detailed description is therefore omitted.

In this way, the controller 3 in an embodiment may judge that an object 50 has been detected within a predetermined distance when the ratio between the peak in the frequency spectrum obtained based on the beat signal and the average noise intensity excluding the peak in the frequency spectrum exceeds a predetermined threshold.

Next, the first band mode according to an embodiment is described in greater detail.

In the first band mode, the distance is measured using radio waves in the first band W1 (for example, a 1 GHz band) that is narrower than the second band W2 (for example, a 4 GHz band), as described above. When a plurality of sensors 10 are used to measure distance in an embodiment, a different band may therefore be allocated to each sensor 10 as the first band W1 of radio waves in the first band mode. The vehicle 100 illustrated in FIG. 2, for example, includes four sensors 10, i.e. the sensor 10A, the sensor 10B, the sensor 10C, and the sensor 10D. In this case, the frequency of radio waves transmitted by the four sensors 10 may, for example, be in different frequency bands. The different bands in this case may have the same bandwidth. A corresponding example is described below.

FIG. 6 illustrates the frequency bands of transmission waves transmitted by a plurality of sensors 10 according to an embodiment. In the first band mode according to an embodiment, a 4 GHz band allocated to the band from 77 GHz to 81 GHz may be allocated 1 GHz at a time, for example as illustrated in FIG. 6, to the four sensors 10 illustrated in FIG. 2. The 1 GHz band from 80 GHz to 81 GHz (frequency A) illustrated in FIG. 6 may, in other words, be allocated to the radio waves transmitted by the sensor 10A illustrated in FIG. 2. The 1 GHz band from 79 GHz to 80 GHz (frequency B) illustrated in FIG. 6 may be allocated to the radio waves transmitted by the sensor 10B illustrated in FIG. 2. The 1 GHz band from 78 GHz to 79 GHz (frequency C) illustrated in FIG. 6 may be allocated to the radio waves transmitted by the sensor 10C illustrated in FIG. 2. The 1 GHz band from 77 GHz to 78 GHz (frequency D) illustrated in FIG. 6 may be allocated to the radio waves transmitted by the sensor 10D illustrated in FIG. 2. In the example illustrated in FIG. 6, a 4 GHz band is allocated 1 GHz at a time to the four sensors 10 illustrated in FIG. 2. The 4 GHz band may, however, be divided into bands other than 1 GHz and is also not limited to being divided into four bands.

As described above, distance may be measured in the first band mode using radio waves in any 1 GHz band, allocated to the band from 77 GHz to 81 GHz, in each sensor 10 among a plurality of sensors 10. In this case, distance may be measured in the second band mode using radio waves in a 4 GHz band allocated to the band from 77 GHz to 81 GHz in at least one sensor 10 among a plurality of sensors 10.

The controller 3 according to an embodiment may, in the first band mode, set the first band W1 of the transmission wave T transmitted from a plurality of transmitters (sensors 10) to different bands in this way.

It is envisioned that interference might occur under limited circumstances when a plurality of vehicles in which the electronic device 1 is mounted transmit radio waves in the first band mode after frequencies are allocated as described above.

For example, the sensor 10A is installed in the front (travel direction) of the vehicle 100 illustrated in FIG. 2. The sensor 10A transmits radio waves in the 1 GHz band from 80 GHz to 81 GHz (frequency A) illustrated in FIG. 6 in the first band mode. Here, the vehicle 200 illustrated in FIG. 1 is also assumed to have the same electronic device 1 as the vehicle 100 mounted therein. The sensor 10A is also installed in the front (travel direction) of the vehicle 200 in this case. Like the sensor 10A of the vehicle 100, the sensor 10A of the vehicle 200 also transmits radio waves in the 1 GHz band from 80 GHz to 81 GHz (frequency A) illustrated in FIG. 6 in the first band mode. The vehicle 100 and the vehicle 200 are oncoming vehicles relative to each other, as illustrated in FIG. 1. Even in this case, the problem of interference does not occur if the timing of radio wave transmission differs between the sensor 10A of the vehicle 100 and the sensor 10A of the vehicle 200. The problem of interference could occur, however, if the timing of radio wave transmission happens to overlap between the sensor 10A of the vehicle 100 and the sensor 10A of the vehicle 200.

In an embodiment, the controller 3 may perform control so that, in the electronic devices 1 mounted in a plurality of vehicles, the band of the radio waves transmitted by the sensor 10 installed in the same direction in the vehicles differs. This control is described below in greater detail.

As described in FIG. 3, the controller 3 of the electronic device 1 can acquire (information on) the direction detected by the direction detector 5. Based on the position at which each sensor 10 among a plurality of sensors 10 is installed in the vehicle 100, for example, the controller 3 can therefore identify the direction (bearing) in which each sensor 10 transmits the transmission wave.

FIG. 7 illustrates sensors and transmission waves according to an embodiment. As illustrated in FIG. 7, the vehicle 100 is assumed to be traveling in the indicated travel direction (east direction), for example. The controller 3 can, in this case, identify that the front of the vehicle 100 is facing east based on detection by the direction detector 5. The controller 3 can therefore identify that the direction in which the sensor 10A transmits the transmission wave is mainly east when the sensor 10A is installed at the front of the vehicle 100. The controller 3 can similarly identify that the sensor 10B installed at the left side of the vehicle 100 mainly transmits the transmission wave to the north. The controller 3 can similarly identify that the sensor 10C installed at the right side of the vehicle 100 mainly transmits the transmission wave to the south. The controller 3 can similarly identify that the sensor 10D installed at the rear of the vehicle 100 mainly transmits the transmission wave to the west.

The controller 3 of the electronic device 1 mounted in the vehicle 100 may perform control so that the first band W1 of the transmission wave T transmitted by a plurality of sensors 10 is a different band in accordance with the corresponding bearing. For example, the 1 GHz band from 80 GHz to 81 GHz (frequency A) illustrated in FIG. 6 may be allocated to the east-facing sensor 10A illustrated in FIG. 7. The 1 GHz band from 79 GHz to 80 GHz (frequency B) illustrated in FIG. 6 may similarly be allocated to the north-facing sensor 10B illustrated in FIG. 7. The 1 GHz band from 78 GHz to 79 GHz (frequency C) illustrated in FIG. 6 may similarly be allocated to the south-facing sensor 10C illustrated in FIG. 7. The 1 GHz band from 77 GHz to 78 GHz (frequency D) illustrated in FIG. 6 may similarly be allocated to the west-facing sensor 10D illustrated in FIG. 7.

In an embodiment, the same electronic device 1 as the one mounted in the vehicle 100 may also be mounted in the vehicle 200 illustrated in FIG. 1, for example. The same bands as for the vehicle 100 may, in this case, be allocated to the plurality of sensors 10 installed in the vehicle 200 as well. Assuming that the vehicle 200 is facing the vehicle 100 illustrated in FIG. 7, for example, the sensor 10 installed in the front of the oncoming vehicle 200 faces west. In this case, the 1 GHz band from 77 GHz to 78 GHz (frequency D) illustrated in FIG. 6 may be allocated to the west-facing sensor 10 installed at the front of the oncoming vehicle 200.

As a result of the above-described control, radio waves in a 1 GHz band from 80 GHz to 81 GHz (frequency A) are transmitted from the sensor 10A installed at the front of the vehicle 100 traveling to the east. Radio waves in a 1 GHz band from 77 GHz to 78 GHz (frequency D) are transmitted from the sensor 10A installed at the front of the vehicle 200 facing the vehicle 100 and traveling to the west. The problem of interference can therefore be avoided or reduced even if the timing of radio wave transmission happens to overlap between the sensor 10A of the vehicle 100 and the sensor 10A of the vehicle 200, for example.

The controller 3 according to an embodiment may, in the first band mode, set the first band W1 of the transmission wave T transmitted from a plurality of sensors 10 to different bands in accordance with the direction in which the transmission wave T is transmitted. In this case, the controller 3 may judge the direction in which the transmission wave T is transmitted based on the direction detected by the above-described direction detector 5.

As described above, the electronic device 1 according to an embodiment controls the bands of transmission waves to differ in accordance with the direction in which the sensors 10 installed in each vehicle transmit radio waves. The electronic device 1 according to an embodiment therefore reduces the probability of interference or mixing between radio waves transmitted by sensors 10 of a plurality of vehicles, even when the vehicles are traveling towards each other.

Although the present disclosure is based on embodiments and drawings, it is to be noted that various changes and modifications will be apparent to those skilled in the art based on the present disclosure. Therefore, such changes and modifications are to be understood as included within the scope of the present disclosure. For example, the functions and the like included in the various functional components may be reordered in any logically consistent way. A plurality of functional components may be combined into one or divided. The embodiments of the present disclosure are not limited to being implemented precisely as described and may be implemented by combining or partially omitting the features thereof as appropriate. In other words, a person of ordinary skill in the art could change or modify the matter of the present disclosure in various ways based on the present disclosure. Therefore, such changes and modifications are included within the scope of the present disclosure. For example, functional components, means, steps, or the like of each embodiment may be added to other embodiments or be replaced by functional components, means, steps, or the like of other embodiments in a logically consistent manner. A plurality of functional components, means, steps, or the like may be combined into one or divided in each embodiment. The above embodiments of the present disclosure are not limited to being implemented precisely as described and may be implemented by combining or partially omitting the features thereof.

The above embodiments are not limited to being implemented as the electronic device 1. For example, the above embodiments may be implemented as a control method of a device such as the electronic device 1. Furthermore, the above embodiments may be implemented as a control program of a device such as the electronic device 1, for example.

An example of measuring distance based on a received signal of radio waves has been described in the above embodiments. As described above, however, distance may be measured based on a received signal of an optical wave or a received signal of an audio wave in an embodiment.

REFERENCE SIGNS LIST

1 Electronic device
3 Controller
5 Direction detector
7 Notification interface
10 Sensor
12 Storage
14 Synthesizer
20 Transmitter
21 Clock generator
22 Signal generator
23 Quadrature modulator
24, 33, 34 Mixer
25 Transmission amplifier
26 Transmission antenna
30 Receiver
31 Reception antenna
32 Reception amplifier
35 Low-pass filter
36 A/D converter
37 FFT processor
50 Object
100, 200 Vehicle

The invention claimed is:

1. An electronic device comprising:
a transmitter configured to transmit a transmission wave; and
a controller configured to perform control to enable switching between a first band mode such that the transmission wave is in a first band and a second band mode such that the transmission wave is in a second band broader than the first band;
wherein the controller is configured to:
detect whether an object is within a predetermined distance,
switch to the second band mode upon detecting that the object is within the predetermined distance while in the first mode,
remain in the second band mode for an entire duration the object is detected as being within the predetermined distance,
measure a distance to the object based on a beat signal obtained from a signal transmitted as the transmission wave and a signal received as a reflected wave, the reflected wave being a portion of the transmission wave reflected by the object, and
judge that the object is detected within the predetermined distance when a ratio between a peak in a frequency spectrum obtained based on the beat signal and an average noise intensity excluding the peak in the frequency spectrum exceeds a predetermined threshold.

2. The electronic device of claim 1, wherein millimeter waves with a bandwidth of 1 gigahertz are transmitted as the transmission wave in the first band mode.

3. The electronic device of claim 1, wherein millimeter waves with a bandwidth of 4 gigahertz are transmitted as the transmission wave in the second band mode.

4. The electronic device of claim 1, wherein in the first band mode, the controller is configured to set the first band of the transmission wave transmitted from a plurality of transmitters to a different band for each transmitter.

5. The electronic device of claim 4, wherein in the first band mode, the controller is configured to set the first band of the transmission wave transmitted from the plurality of transmitters to a different band in accordance with a direction of transmission of the transmission wave.

6. The electronic device of claim 5, wherein the controller is configured to judge the direction of transmission of the transmission wave based on a direction detected by a direction detector.

7. A control method comprising:
transmitting a transmission wave; and
performing control to enable switching between a first band mode such that the transmission wave is in a first band and a second band mode such that the transmission wave is in a second band broader than the first band;
wherein the control includes:
detecting whether an object is within a predetermined distance,
switching to the second band mode upon detecting that the object is within the predetermined distance while in the first mode,
remaining in the second band mode for an entire duration the object is detected as being within the predetermined distance
measuring a distance to the object based on a beat signal obtained from a signal transmitted as the transmission wave and a signal received as a reflected wave, the reflected wave being a portion of the transmission wave reflected by the object, and
judging that the object is detected within the predetermined distance when a ratio between a peak in a frequency spectrum obtained based on the beat signal and an average noise intensity excluding the peak in the frequency spectrum exceeds a predetermined threshold.

8. A non-transitory computer-readable recording medium that stores a control program, the control program configured to control an electric device to execute processes of:
transmitting a transmission wave; and
performing control to enable switching between a first band mode such that the transmission wave is in a first band and a second band mode such that the transmission wave is in a second band broader than the first band;
wherein the control includes:
detecting whether an object is within a predetermined distance,
switching to the second band mode upon detecting that the object is within the predetermined distance while in the first mode,
remaining in the second band mode for an entire duration the object is detected as being within the predetermined distance
measuring a distance to the object based on a beat signal obtained from a signal transmitted as the transmission wave and a signal received as a reflected wave, the reflected wave being a portion of the transmission wave reflected by the object, and judging that the object is detected within the predetermined distance when a ratio between a peak in a frequency spectrum obtained based on the beat signal and an average noise intensity excluding the peak in the frequency spectrum exceeds a predetermined threshold.

* * * * *